(12) United States Patent
Eads et al.

(10) Patent No.: US 10,958,659 B2
(45) Date of Patent: Mar. 23, 2021

(54) SETTING APPLICATION PERMISSIONS IN A CLOUD COMPUTING ENVIRONMENT

(71) Applicant: Red Hat, Inc., Raleigh, NC (US)

(72) Inventors: David Michael Eads, Raleigh, NC (US); Benjamin Michael Parees, Durham, NC (US); Jordan Thomas Liggitt, Fuquay-Varina, NC (US); Gabriel Garcia Montero, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 141 days.

(21) Appl. No.: 15/690,505

(22) Filed: Aug. 30, 2017

(65) Prior Publication Data

US 2019/0068612 A1    Feb. 28, 2019

(51) Int. Cl.
*G06F 7/04* (2006.01)
*H04L 29/06* (2006.01)
*G06F 21/00* (2013.01)
*G06F 21/41* (2013.01)
*G06F 21/62* (2013.01)

(52) U.S. Cl.
CPC ............ *H04L 63/105* (2013.01); *G06F 21/00* (2013.01); *G06F 21/41* (2013.01); *G06F 21/62* (2013.01); *H04L 63/0815* (2013.01); *H04L 63/102* (2013.01)

(58) Field of Classification Search
CPC . H04L 63/105; H04L 63/0815; H04L 63/102; H04L 63/10; G06F 21/62; G06F 21/6209
USPC .......................................................... 726/4
See application file for complete search history.

(56) References Cited

U.S. PATENT DOCUMENTS

| 8,474,017 | B2 | 6/2013 | Schultz et al. |
| 8,769,622 | B2 | 7/2014 | Chang et al. |
| 9,009,806 | B2 | 4/2015 | Hyland et al. |
| 9,407,664 | B1 * | 8/2016 | Banerjee ................. H04L 63/20 |
| 9,450,963 | B2 | 9/2016 | Srinivasan et al. |
| 9,654,507 | B2 | 5/2017 | Gangadharappa et al. |
| 2014/0026122 | A1 * | 1/2014 | Markande ........... G06F 11/3688 717/124 |
| 2014/0280961 | A1 * | 9/2014 | Martinez ............. H04L 41/5054 709/226 |

(Continued)

OTHER PUBLICATIONS

He et al, Stochastic Programming-Based Dynamic Authorization Model for Cloud Services Environments, Feb. 22, 2012, IEEE, pp. 1090-1094.*

(Continued)

*Primary Examiner* — Luu T Pham
*Assistant Examiner* — Jenise E Jackson
(74) *Attorney, Agent, or Firm* — Kilpatrick Townsend & Stockton LLP (57) ABSTRACT

Application permissions can be set in a cloud computing environment based on a user's authorization level in the cloud computing environment. For example, a system can determine that a user has a particular authorization level in a cloud computing environment. The system can determine that the user is to have particular permissions for a continuous integration tool by mapping the particular authorization level to the particular permissions. The system can then set a permission setting for the continuous integration tool to limit the user to the particular permissions.

17 Claims, 4 Drawing Sheets

(56) References Cited

U.S. PATENT DOCUMENTS

| | | | | |
|---|---|---|---|---|
| 2015/0254577 A1* | 9/2015 | Sullivan | ................ | G06Q 10/00 |
| | | | | 705/51 |
| 2016/0092348 A1* | 3/2016 | Straub | ...................... | G06F 8/61 |
| | | | | 717/124 |
| 2016/0335118 A1* | 11/2016 | Beiter | ..................... | G06F 9/468 |
| 2017/0185793 A1* | 6/2017 | Rotem | ............... | H04L 63/1441 |
| 2018/0027006 A1* | 1/2018 | Zimmermann | ..... | H04L 63/0245 |
| | | | | 726/11 |
| 2018/0089066 A1* | 3/2018 | Barnett | .............. | G06F 11/3664 |
| 2018/0316559 A1* | 11/2018 | Thulasi | .............. | G06F 9/45558 |

OTHER PUBLICATIONS

Wu et al, An Access Control Method of Cloud Computing Resources Based on Quantified-Role, Nov. 11, 2012, IEEE, pp. 919-923.*

Moghaddam et al, UAA: User Authentication Agent for Managing User Identifies in Cloud Computing Environments, Aug. 1, 2014, IEEE, pp. 208-212.*

Barnes, R.L., "The OAuth Security Model for Delegated Authorization," BBN Technologies, Jul. 2009, https://tools.ietf.org/id/draft-barnes-oauth-model-01.html.

Yanchyshyn, M., "Identity Federation and SSO for SaaS on AWS," Senior Manager of Solutions Architecture for the AWS Partner Network, Jul. 14, 2015, https://aws.amazon.com/blogs/apn/identity-federation-and-sso-for-saas-on-aws/.

"Openshift: Jenkins-Openshift-Login-Plugin," https://github.com/openshift/jenkins-openshift-login-plugin/blob/master/README.md.

Zolfonoon, R., "SAML Meets OAuth in the Cloud: A Marriage Made in Heaven," RSA, The Security Division of EMC, 2013, https://www.rsaconference.com/writable/presentations/file_upload/arch-r08-saml-meets-oauth-in-the-cloud.pdf.

Madsen, P., "OAuth—Authentication & Authorization for Mobile Applications," Senior Technical Architect within the Office of the CTO at Ping Identity, May 6, 2011, https://blog.cloudsecurityalliance.org/2011/05/06/oauth-authentication-authorization-for-mobile-applications/.

* cited by examiner

SETTING APPLICATION PERMISSIONS IN A CLOUD COMPUTING ENVIRONMENT

TECHNICAL FIELD

The present disclosure relates generally to access control. More specifically, but not by way of limitation, this disclosure relates to setting application permissions in a cloud computing environment.

BACKGROUND

A user can login to a cloud computing environment using a set of login credentials (e.g., a username and password). After logging in, the user may be able to access certain features of the cloud computing environment based on the user's authorization level in the cloud computing environment. For example, a user may be able to request that the cloud computing environment deploy certain applications if the user's authorization level permits access to those applications.

In some cases, an application deployed for a user in the cloud computing environment may require the user to separately login to the application with another set of login credentials before the user can use the application. This can be referred to as a two-step login process, whereby the user must first login to the cloud computing environment using one set of login credentials and then separately login to the application using another set of login credentials. After logging in to the application, the user may be able to access certain functions and features of the application based on the application permissions accorded to the user.

DETAILED DESCRIPTION

Typically, a user's application permissions are managed separately from, and unrelated to, the user's authorization level in a cloud computing environment. But there can be disadvantages to managing a user's application permissions separately from the user's authorization level in the cloud computing environment. For example, the user may be able to perform functions using the application (due to more lenient application permissions) that the user should not be able to perform based on the user's authorization level in the cloud computing environment.

Some examples of the present disclosure can overcome one or more of the abovementioned issues by using the user's authorization level in the cloud computing environment to set the user's application permissions, thereby helping to ensure that the user has consistent rights and restrictions in the cloud computing environment and the application.

As a particular example, a cloud-service provider can provide access to a cloud computing environment that is built on the OpenShift platform. The cloud-service provider can be, for example, Amazon™. Users of the cloud computing environment can have different authorization levels. An authorization level can dictate the rights of and limitations on a user in the cloud computing environment. For example, an administrative user of the cloud computing environment may have a higher authorization level that permits a greater level of access to the cloud computing environment than a general user. After logging in to the cloud computing environment, a user can request that the cloud computing environment deploy the application Jenkins on behalf of the user. The cloud computing environment can respond to the request by deploying Jenkins in the cloud computing environment. The user can then login to Jenkins using another set of login credentials or via a single sign-on scheme, which can be provided using technologies such as OAuth. Once the user has successfully logged in to Jenkins, the cloud computing environment can set the user's permissions in Jenkins based on the user's authorization level in the cloud computing environment. For example, the cloud computing environment can map the user's authorization level in the cloud computing environment to a specific set of permissions in Jenkins, and update the user's permissions in Jenkins to be the specific set of permissions. This can enable the user's authorization level in the cloud computing environment to dictate the user's permissions in Jenkins.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
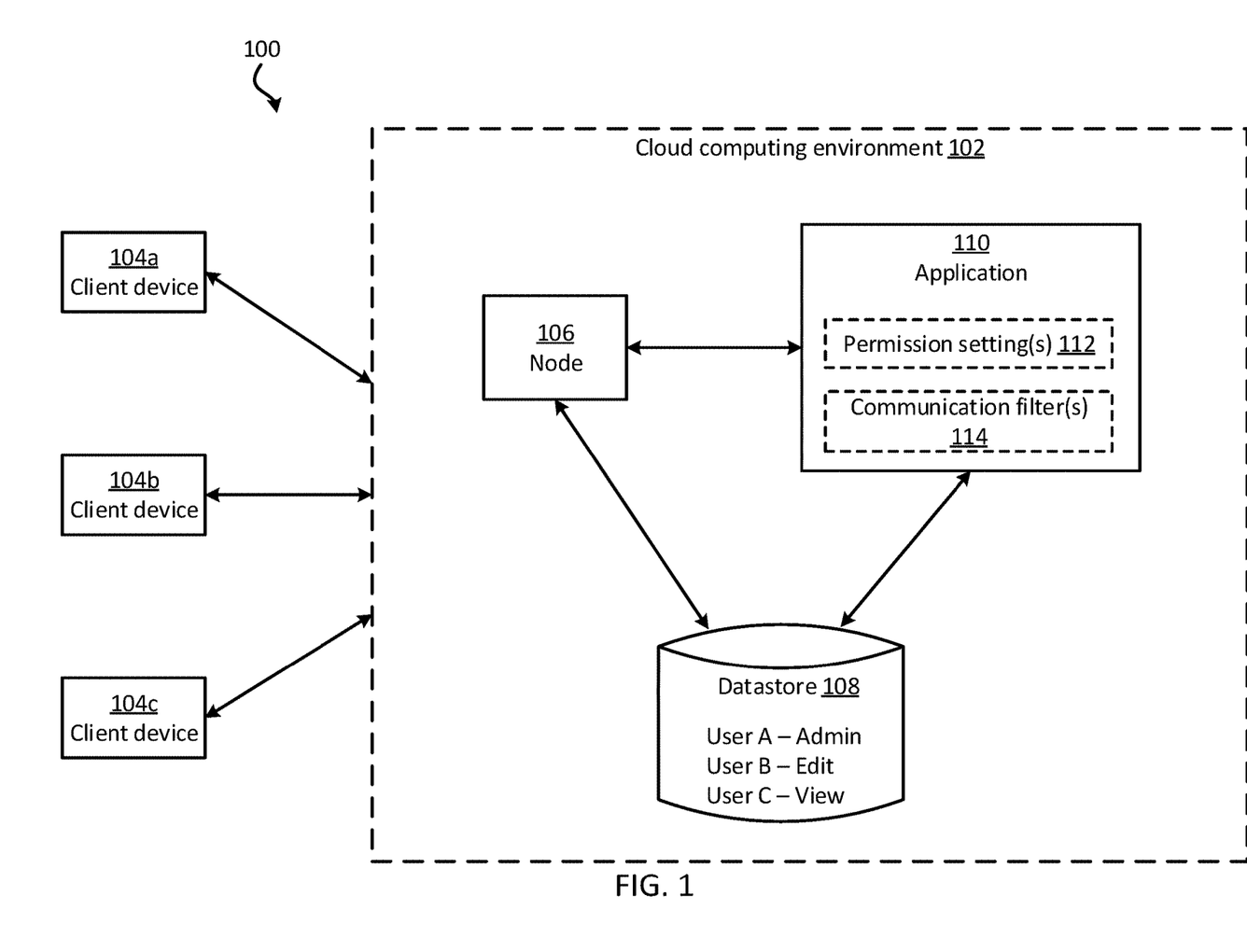
FIG. 1 is a block diagram of an example of a system for setting application permissions in a cloud computing environment according to some aspects.

FIG. 1 is a block diagram of a system 100 for setting application permissions in a cloud computing environment 102 according to some aspects. A user can login to the cloud computing environment 102 using a client device, such as client device 104a. The cloud computing environment 102 can determine an authorization level for the user via datastore 108, which can store relationships between users and their authorization levels in the cloud computing environment 102, and limit the user's capabilities in the cloud computing environment 102 based on the user's authorization level. The user may also login to an application 110 executing within the cloud computing environment 102. The cloud computing environment 102 can then set one or more permission settings 112 for the application 110 based on the user's authorization level in the cloud computing environment 102. Thus, the permission settings 112 for the user in the application 110 can be related to the user's authorization level in the cloud computing environment 102.

More specifically, the cloud computing environment 102 can enable users to access a shared pool of resources, such as software, memory, processing power, and data. The cloud computing environment 102 can be formed from one or more nodes (e.g., servers, computing devices, virtual machines, or any combination of these), such as node 106, in communication with one another. At least one node in the cloud computing environment 102 can be a master node. For example, node 106 can be a master node. A master node can control user authentication, user authorization, or both in the cloud computing environment 102. The master node may perform other tasks in the cloud computing environment 102, too, such as managing other nodes and allocation of resources in the cloud computing environment 102.

The cloud computing environment 102 can be in communication with a datastore 108, which can be a database, random access memory (RAM), a hard disk, or other type of data-storage means. Although the datastore 108 is shown in FIG. 1 as being internal to the cloud computing environment 102, in other examples the datastore 108 can be external to the cloud computing environment 102. The datastore 108 can store relationships between users of the cloud computing environment 102 and authorization levels for the users in the cloud computing environment 102. For example, the datastore 108 can include a mapping from "User A" to an "Admin" authorization level, which may provide the user with administrative level access. Additionally or alternatively, the datastore 108 can include a mapping from "User B" to an "Edit" authorization level, which can enable the user to view and edit files. Additionally or alternatively, the datastore 108 can include a mapping from "User C" to a "View" authorization level, which may enable a user to view, but not edit, files. The datastore 108 can map any number and combination of users to any number and combination of authorization levels in the cloud computing environment 102.

At least one application 110 can be deployed in the cloud computing environment 102. In some examples, the application 110 includes a continuous integration tool. A continuous integration tool can automatically save, build, and test updates to program code (for software) at frequent intervals to help identify program-code errors more quickly and easily. Examples of a continuous integration tool can be Jenkins, Buildbot, Travis CI, Strider, Go, and Integrity. In other examples, the application 110 includes an orchestration tool. An orchestration tool can be software used to virtualize, provision, or otherwise manage resources in a cloud computing environment. Examples of orchestration tools can include Heat, Ansible, Puppet, Juju, SaltStack, Chef, Kubernetes, and CloudFormation. In still other examples, the application 110 can be another type of tool for performing another function.

The application 110 can include one or more permission settings 112. The permission settings 112 can fall within permission categories, such as (i) overall permissions, (ii) slave permissions, (iii) job permissions, (iv) run permissions, (v) view permissions, (vi) software configuration management (SCM) permissions; or (vii) any combination of these. The overall permissions can include an administer setting that enables a user to make system-wide configuration changes; a read setting that enables the user to view most pages within the application 110; a run-scripts setting that enables the user to run scripts in the application; an upload plugins setting that enables the user to upload plugins into the application; a configuration setting that enables the user to configure sites and proxy settings in the application; or any combination of these. The slave permission can include a configure-slaves setting that enables the user to configure existing slaves; a delete-slaves setting that enables the user to delete existing slaves; a create-slaves setting that enables the user to create new slaves; a disconnect-slave setting that enables the user to disconnect slaves or mark slaves as temporarily offline; a connect-slaves setting that enables the user to connect slaves or mark slaves as online; or any combination of these.

The job permissions can include a create-job permission that enables a user to create a new job; a delete-job permission that enables the user to delete an existing job; a configure-job setting that enables the user to update the configuration of an existing job; a read-project setting that enables the user to have read-only access to project configurations; a discover setting that redirects anonymous users to a login form rather than presenting an error message if the anonymous users do not have permission to view jobs; a build setting that enables the user to start a new build or cancel a running build; a workspace setting that enables the user to retrieve the contents of a workspace that the application 110 has checked out for performing a build; a cancel setting that enables the user to cancel a running build; or any combination of these. The run permissions can include a delete-build setting that enables the user to delete a specific build from a build's history; an update-properties setting that enables the user to update the description and other properties of a build; or both. The run permissions can include a create-view setting that enables the user to create a new view; a delete-view setting that enables the user to delete an existing view; a configure-view setting that enables the user to update the configuration of existing views; a read-view setting that enables the user to see any existing views; or any combination of these. The SCM permissions can include a tag setting that enables the user to create a new tag in the source code repository for a given build. Although examples of permission categories and settings are provided, that application 110 can have any number and combination of permission categories and settings.

Users can interact with the cloud computing environment 102 via client devices 104a-c. Examples of the client devices 104a-c can be laptop computers, desktop computers, tablets, mobile devices, servers, or any combination of these. The client devices 104a-c can communicate with the cloud computing environment 102 via one or more networks, such as the Internet. Each client device 104a-c can be controlled by a single user of the cloud computing environment 102 or multiple users of the cloud computing environment 102.

A user can authenticate with the cloud computing environment 102 via a client device, such as client device 104a. The client device can communicate authentication credentials for the user to the cloud computing environment 102, which can authenticate the user by comparing authentication credentials to authentication information stored in a datastore, such as datastore 108 or another datastore. After authenticating the user, the cloud computing environment 102 can access the datastore 108 to determine the authorization level for the user. The cloud computing environment 102 can then limit the user to performing functions that are allowed by the user's authorization level.

In some examples, the user may wish to access the application 110, but may be unable to do so without first authenticating with the application 110. The user can authenticate with the application 110 by causing the client device to provide application authentication-credentials to the application 110. The application authentication-credentials can be different from the authentication credentials for the cloud computing environment 102. Alternatively, the application 110 can use a single sign-on scheme for authentication. In some examples, the single sign-on scheme can use OAuth, OpenID, OpenID Connect, Facebook™ Connect, or any combination of these. The single sign-on scheme can enable the user to supply the initial authentication credentials to the cloud computing environment 102 and also gain access to the application 110, without having to supply separate application authentication-credentials to the application 110. The single sign-on scheme can eliminate the need for a two-step authentication process, reducing the amount of time and difficulty it takes to authenticate with both the cloud computing environment 102 and the application 110.

The cloud computing environment 102 can set the user's permission settings 112 in the application 110 based on the user's authorization level in the cloud computing environment 102. For example, the application 110 or node 106 within the cloud computing environment 102 can set the user's permission settings 112 in the application 110 based on the user's authorization level in the cloud computing environment 102. The cloud computing environment 102 can set the permission settings 112 before or after the user authenticates with the application 110. In some examples, the cloud computing environment 102 is in communication with a datastore (e.g., datastore 108 or another datastore) in which one or more authorization levels in the cloud computing environment 102 are mapped to one or more permission settings 112 in the application 110. For example, the datastore can have an "Admin" authorization level mapped to at least two of the permission settings discussed above. The cloud computing environment 102 can access the datastore and determine the permission settings that correspond to the user's authorization level. The cloud computing environment 102 can then set the permission settings 112 in the application 110 to be the permission settings that correspond to the user's authorization level. In other examples, the cloud computing environment 102 can access logical rules, an algorithm, or other information to determine the permission settings that correspond to the user's authorization level. The cloud computing environment 102 can use this information to determine the permission settings that correspond to the user's authorization level, and then set the permission settings 112 for the application 110 accordingly.

In some examples, one or more communication filters 114 associated with the application 110 can perform some or all of the features discussed herein. A communication filter can be a software object that is integrated with an application or otherwise associated with an application for intercepting communications to the application and performing functions based on the communications. Examples of a communication filter can be a servlet filter, a plugin for a hypertext transfer protocol (HTTP) sprayer, a plugin for a router, or any combination of these. In one example, the communication filter 114 can servlet filter in the form of a plugin or extension that is integrated into a web application to intercept communications (e.g., hypertext transfer protocol (HTTP) requests) to or from the web application and perform functions based on the communications. In other examples, the communication filter 114 can be separate from the web application but intercept communications to or from the web application. In some examples, the communication filter 114 can intercept an authentication communication from the cloud computing environment 102 to the application 110, or vice versa. For example, the communication filter 114 can detect (e.g., intercept) an authentication-success communication that indicates that the user was successfully authenticated with the application 110. Based on detecting a certain authentication communication, such as the authentication-success communication, the communication filter 114 can communicate with the node 106 or the datastore 108 to determine an authorization level for the user in the cloud computing environment 102. The communication filter 114 can then determine permission settings that correspond to the user's authorization level, and set the permission settings 112 in the application 110 to be the permission settings that correspond to the user's authorization level. Any number and combination of communication filter 114 can be used to implement any number and combination of the features discussed above.

Figure 2:
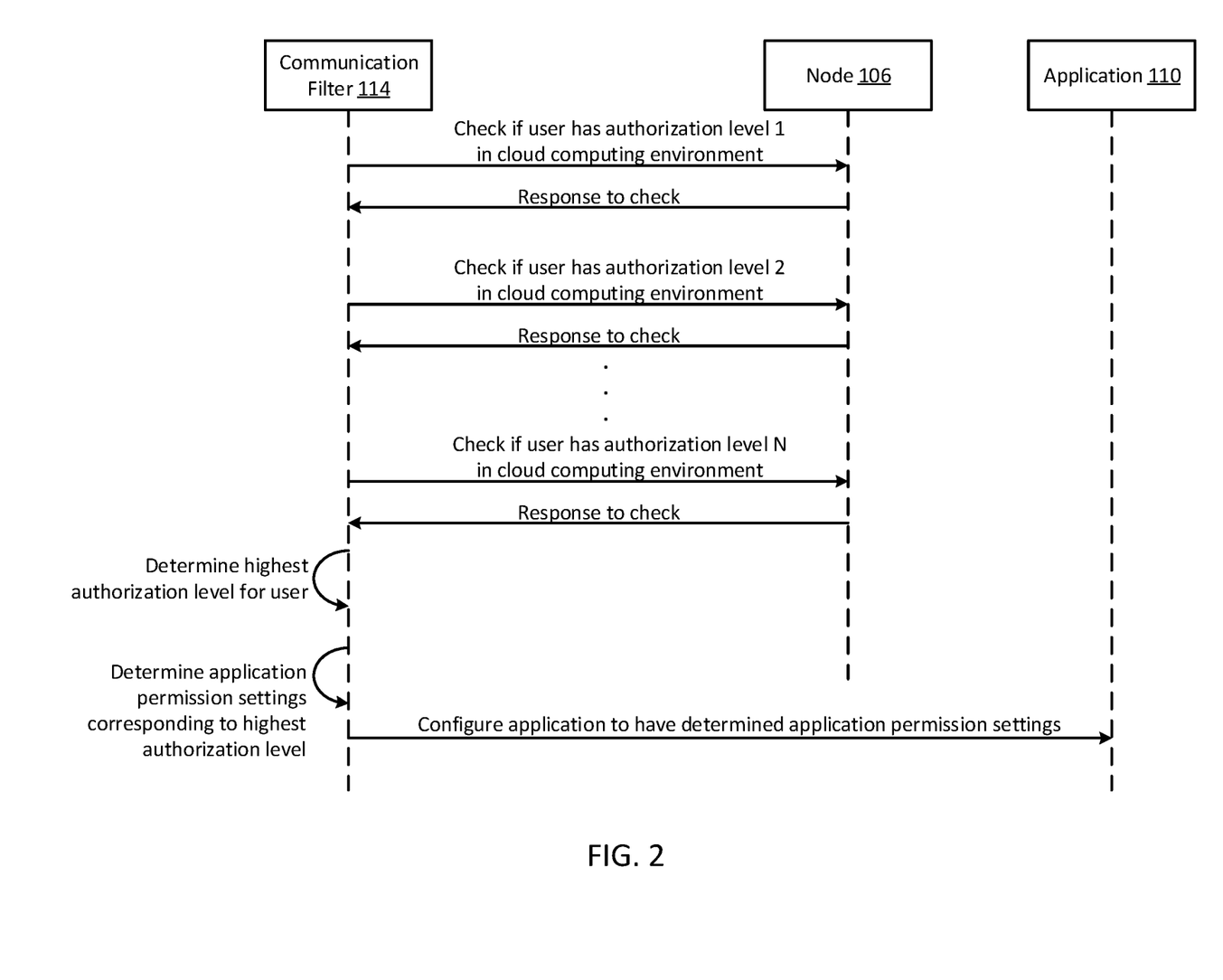
FIG. 2 is a sequence diagram of an example of a process for setting application permissions in a cloud computing environment according to some aspects.

FIG. 2 is a sequence diagram of an example of a process for setting application permissions in a cloud computing environment according to some aspects. As shown in FIG. 2, the communication filter 114 can communicate with node 106 (which can be a master node) to determine an authorization level in the cloud computing environment for the user. In some examples, the communication filter 114 can transmit a single communication requesting the authorization level in the cloud computing environment for the user and receive a response indicating the user's authorization level from the node 106. In other examples, such as the example shown in FIG. 2, the communication filter 114 can transmit multiple communications to check if the user has specific authorization levels, such as authorization levels 1-N, and receive multiple responses from the node 106. An example of the communication transmitted from the communication filter 114 can be an OAuth delegated authorization check. The communication filter 114 can then determine the highest authorization level for the user. For example, the communication filter 114 may receive responses from the node 106 that the user has all three of an Admin authorization level (e.g., authorization level 1), an Edit authorization level (e.g., authorization level 2), and a View authorization level (e.g., authorization level N). The communication filter 114 can determine that the Admin authorization level is the highest authorization-level among the three. After determining the highest authorization level for the user, the communication filter 114 can determine application permission settings that correspond to the highest authorization level (e.g., by further communicating with the node 106 or a datastore 108). Then, the communication filter 114 can configure the application 110 to have the determined application permission settings. The steps shown in FIG. 2 are for illustrative purposes, and in other examples more steps, different steps, or a different order of the steps can be performed. Also, different components (e.g., than the communication filter 114, the application 110, or the node 106) may perform some or all of the steps of FIG. 2.

Referring back to FIG. 1, in some examples an authorization level for a user in the cloud computing environment 102 may be specific to a certain project. For example, the cloud computing environment 102 can have multiple projects, which can include executing applications (e.g., application 110), accessing data, or both. In some examples, a user may have different authorization levels for two or more projects, such as an Admin authorization level for one project and a View authorization level for another project. The cloud computing environment 102 can set the permission settings 112 for an application 110 that is part of a specific project based on the user's authorization level for the specific project. For example, the user can have an Admin authorization level for a first project in which Jenkins is executing, and a View authorization level for a second project in which Jenkins is executing. The cloud computing environment 102 can set the permission settings for Jenkins in the first project based on the Admin authorization level for the user, and the permission settings for Jenkins in the second project based on the View authorization level for the user.

Figure 3:
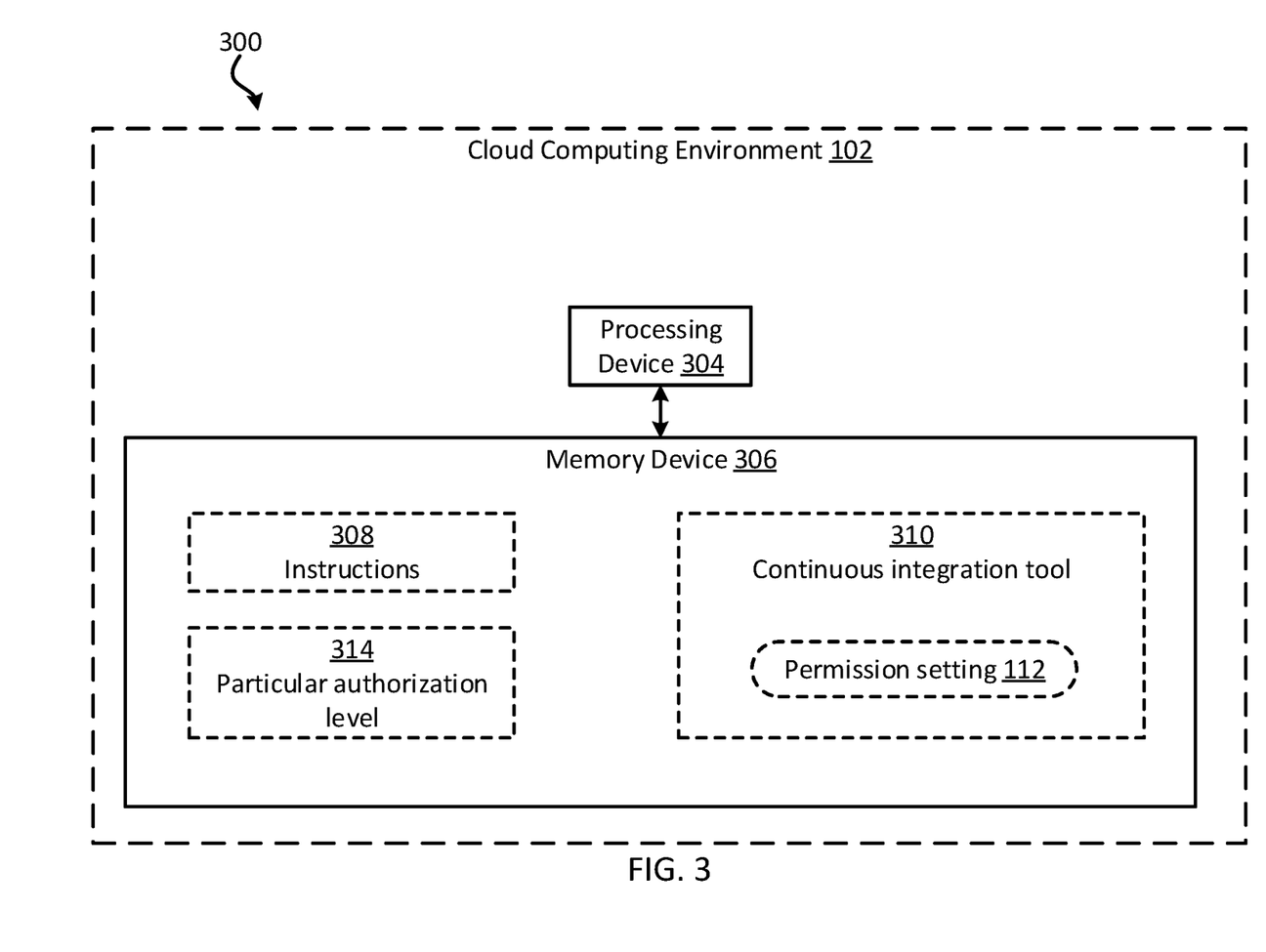
FIG. 3 is a block diagram of another example of a system for setting application permissions in a cloud computing environment according to some aspects.

FIG. 3 is a block diagram of another example of a system 300 for setting application permissions in a cloud computing environment 102 according to some aspects. The system 300 includes a processing device 304 communicatively coupled to a memory device 306. The processing device 304 can include one processing device or multiple processing devices. Non-limiting examples of the processing device 304 include a Field-Programmable Gate Array (FPGA), an application-specific integrated circuit (ASIC), a microprocessor, etc. The processing device 304 can execute one or more operations for setting application permissions in a cloud computing environment. The processing device 304 can execute instructions 308 stored in the memory device 306 to perform the operations. In some examples, the instructions 308 can include processor-specific instructions generated by a compiler or an interpreter from code written in any suitable computer-programming language, such as C, C++, C#, etc.

Memory device 306 can include one memory device or multiple memory devices. The memory device 306 can be non-volatile and may include any type of memory device that retains stored information when powered off. Non-limiting examples of the memory device 306 include electrically erasable and programmable read-only memory (EEPROM), flash memory, or any other type of non-volatile memory. In some examples, at least some of the memory devices 306 can include a medium from which the processing device 304 can read instructions 308. A computer-readable medium can include electronic, optical, magnetic, or other storage devices capable of providing the processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

The memory device 306 can also include a continuous integration tool 310, which can be a type of application. The continuous integration tool 310 can have one or more permission settings, such as permission setting 112. The processing device 304 can determine that a user has a particular authorization level 314 in the cloud computing environment 102, determine that the user is to have particular permissions for the continuous integration tool 310, and then set the permission setting 112 for the continuous integration tool 310 to limit the user to the particular permissions. In other examples, the system 300 can include other types of applications, for which permission settings can be configured based on the user's authorization level in the cloud computing environment 102.

The systems of FIGS. 1 and 3 are shown for illustrative purposes, and other examples can include more components, fewer components, or a different arrangement of the components shown in FIGS. 1 and 3. For example, referring to FIG. 3, the cloud computing environment 102 can have multiple processing devices and multiple memory devices distributed across multiple nodes that form the cloud computing environment 102. And the instructions 308 or other components of memory device 306 can be distributed among the multiple memory devices.

Figure 4:
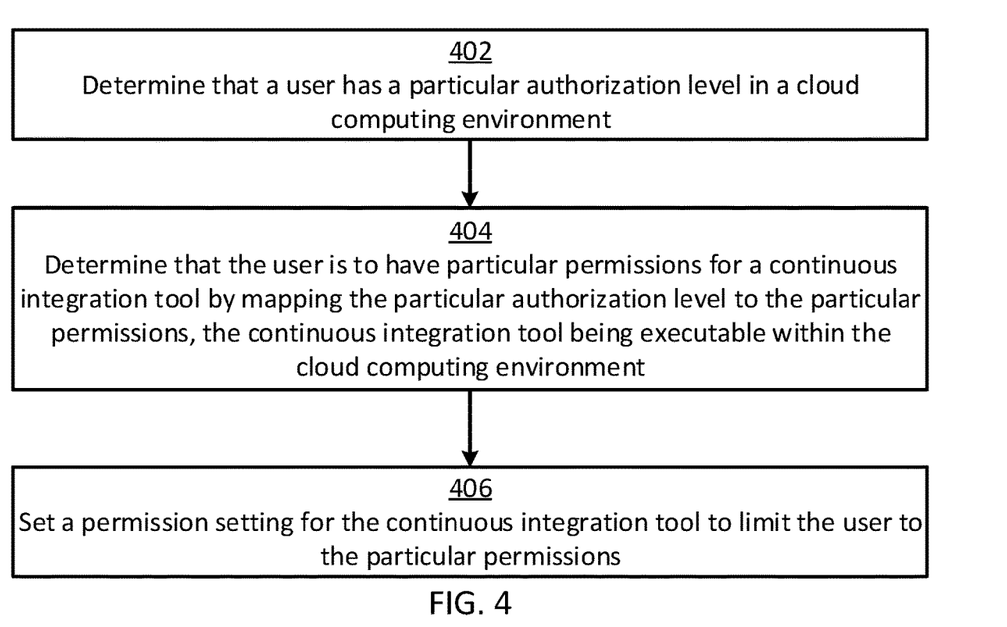
FIG. 4 is a flow chart of an example of a process for setting application permissions in a cloud computing environment according to some aspects.

In some examples, the processing device 304 can implement the steps shown in FIG. 4 to set application permissions in a cloud computing environment 102. In other examples, the processing device 304 can implement more steps, fewer steps, or a different order of the steps shown in FIG. 4. The steps of FIG. 4 are described below with reference to the components of FIG. 3 above.

In block 402, the processing device 304 determines that a user has a particular authorization level 314 in a cloud computing environment 102. The processing device 304 can access memory device 306 or another datastore that is local to, or remote from, the processing device 304 to determine the particular authorization level 314 for the user.

In block 404, the processing device 304 determines that the user is to have particular permissions for a continuous integration tool 310 by mapping the particular authorization level 314 to the particular permissions. The continuous integration tool 310 can be executable within the cloud computing environment 102. The processing device 304 can use a datastore, an algorithm, logical rules, or other techniques to map the particular authorization level 314 to the particular permissions. The processing device 304 can use any number and combination of techniques to map the particular authorization level 314 to the particular permissions In block 406, the processing device 304 sets a permission setting 112 for the continuous integration tool 310 to limit the user to the particular permissions. In some examples, the processing device 304 can set the permission setting 112 by modifying a memory location, in memory device 306, for the permission setting 112. In other examples, the processing device 304 can set the permission setting 112 by modifying a file, such as a configuration file, that controls the permission setting 112. The processing device 304 can use any number and combination of techniques to set the permission setting 112 to limit the user to the particular permissions.

Some examples of the present disclosure can be repeated at preset intervals or in response to certain events. For example, after a preset amount of time (e.g., an hour, day, or week) has passed since setting the permission setting 112 for an application, the processing device 304 can again determine an authorization level for the user in the cloud computing environment 102. The processing device 304 can determine if the authorization level is different from the previously determined authorization level. If not, the processing device 304 may leave the permission setting 112 for the application as is. If so (e.g., the user's authorization level is now Admin and it was previously View), the processing device 304 can determine new permissions that correspond to the new authorization level. The new permissions may be different from the previously determined permissions. The processing device 304 can then configure the application to have the new permissions for the user. For example, the processing device 304 can set the permission setting 112 such that the user has the new permissions.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s).

The invention claimed is:
1. A system comprising:
a processing device; and
a memory device on which instructions are stored that are executable by the processing device for causing the processing device to implement an authorization process comprising:
determining that a user has at least two authorization levels in a cloud computing environment;
selecting a highest authorization level for the user from among the at least two authorization levels in the cloud computing environment, wherein the highest authorization level is an administrator role, an edit role, or a view role;
determining that the user is to have particular permissions for a continuous integration tool by mapping the highest authorization level to the particular per- missions, the continuous integration tool being executable within the cloud computing environment;
authenticate the user with the continuous integration tool subsequent to the user logging in to the cloud computing environment; and
subsequent to authenticating the user with the continuous integration tool, setting a permission setting for the continuous integration tool to limit the user to the particular permissions, wherein the permission setting for the continuous integration tool includes at least one of (i) an overall permission, (ii) a slave permission, (iii) a job permission, (iv) a run permission, (v) a view permission, or (vi) a software configuration management permission.

2. The system of claim 1, wherein a communication filter associated with the continuous integration tool is configured to implement the authorization process.

3. The system of claim 1, wherein the at least two authorization levels correspond to at least two projects in the cloud computing environment.

4. The system of claim 1, wherein the particular permissions is a first set of permissions, and wherein the memory device further includes instructions executable by the processing device for causing the processing device to:
after a preset amount of time has passed since setting the permission setting in the continuous integration tool, determine a new authorization level for the user in the cloud computing environment;
determine that the new authorization level for the user is different from the highest authorization level that was previously determined;
determine that the user is to have a second set of permissions for the continuous integration tool by mapping the new authorization level to the second set of permissions, the second set of permissions being different from the first set of permissions; and
set the permission setting for the continuous integration tool to limit the user to the second set of permissions.

5. The system of claim 1, wherein:
selecting the highest authorization level comprises accessing a database that includes relationships between the user of the cloud computing environment and the at least two authorization levels for the user, the database being maintained by the cloud computing environment.

6. The system of claim 1, wherein the continuous integration tool is configured to detect commits of source code for a software project by one or more programmers and responsively build and test the source code.

7. The system of claim 1, wherein the memory device further includes instructions executable by the processing device for causing the processing device to determine the at least two authorization levels for the user by transmitting at least two communications to a node of the cloud computing environment.

8. The system of claim 1, wherein the continuous integration tool includes the permission setting, and wherein the memory device further includes instructions executable by the processing device for causing the processing device to set the permission setting inside the continuous integration tool to limit the user to the particular permissions.

9. A method comprising:
determining, by a processing device, that a user has at least two authorization levels in a cloud computing environment;
selecting, by the processing device, a highest authorization level for the user from among the at least two authorization levels in the cloud computing environment, wherein the highest authorization level is an administrator role, an edit role, or a view role;
determining, by the processing device, that the user is to have particular permissions for a continuous integration tool by mapping the highest authorization level to the particular permissions, the continuous integration tool being executable within the cloud computing environment;
authenticating, by the processing device, the user with the continuous integration tool subsequent to the user logging in to the cloud computing environment; and
subsequent to authenticating the user with the continuous integration tool, setting, by the processing device, a permission setting for the continuous integration tool to limit the user to the particular permissions, wherein the permission setting for the continuous integration tool includes at least one of (i) an overall permission, (ii) a slave permission, (iii) a job permission, (iv) a run permission, (v) a view permission, or (vi) a software configuration management permission.

10. The method of claim 9, wherein a servlet filter associated with the continuous integration tool is configured to implement the method, and wherein selecting the highest authorization level comprises communicating with a master node in the cloud computing environment to determine an authorization level for the user.

11. The method of claim 9, wherein the at least two authorization levels correspond to at least two projects in the cloud computing environment, and wherein the highest authorization level is for a specific project among the at least two projects.

12. The method of claim 9, wherein the particular permissions is a first set of permissions, and further comprising:
after a preset amount of time has passed since setting the permission setting in the continuous integration tool, determining a new authorization level for the user in the cloud computing environment;
determining that the new authorization level for the user is different from the highest authorization level that was previously determined;
determining that the user is to have a second set of permissions for the continuous integration tool by mapping the new authorization level to the second set of permissions, the second set of permissions being different from the first set of permissions; and
setting the permission setting for the continuous integration tool to limit the user to the second set of permissions.

13. The method of claim 9, wherein:
selecting the highest authorization level comprises accessing a database that includes relationships between the user of the cloud computing environment and the at least two authorization levels for the user, the database being maintained by the cloud computing environment.

14. A non-transitory computer-readable medium in which instructions are stored that are executable by a processing device for causing the processing device to implement an authorization process comprising:
determining that a user has at least two authorization levels in a cloud computing environment;
selecting a highest authorization level for the user from among the at least two authorization levels in the cloud computing environment, wherein the highest authorization level is an administrator role, an edit role, or a view role;

determining that the user is to have particular permissions for a software application by mapping the highest authorization level to the particular permissions, the software application being executable within the cloud computing environment;

authenticate the user with the software application subsequent to the user logging in to the cloud computing environment; and subsequent to authenticating the user with the software application, setting a permission setting for the software application to limit the user to the particular permissions, wherein the permission setting includes at least one of (i) an overall permission, (ii) a slave permission, (iii) a job permission, (iv) a run permission, (v) a view permission, or (vi) a software configuration management permission.

15. The non-transitory computer-readable medium of claim 14, wherein the highest authorization level is an authorization level for a specific project in the cloud computing environment, and wherein the software application is a part of the specific project.

16. The non-transitory computer-readable medium of claim 14, wherein the particular permissions is a first set of permissions, and further including instructions executable by the processing device for causing the processing device to:

after a preset amount of time has passed since setting the permission setting in the software application, determine a new authorization level for the user in the cloud computing environment;

determine that the new authorization level for the user is different from the highest authorization level that was previously determined;

determine that the user is to have a second set of permissions for the software application by mapping the new authorization level to the second set of permissions, the second set of permissions being different from the first set of permissions; and set the permission setting for the software application to limit the user to the second set of permissions.

17. The non-transitory computer-readable medium of claim 14, wherein:

selecting the highest authorization level comprises accessing a database that includes relationships between (i) the user of the cloud computing environment and (ii) the at least two authorization levels for the user, wherein the database is maintained by the cloud computing environment.

* * * * *